Dec. 20, 1938.   R. H. MITCHELL   2,140,712
DIRECT CONNECT IMPLEMENT
Filed July 6, 1936
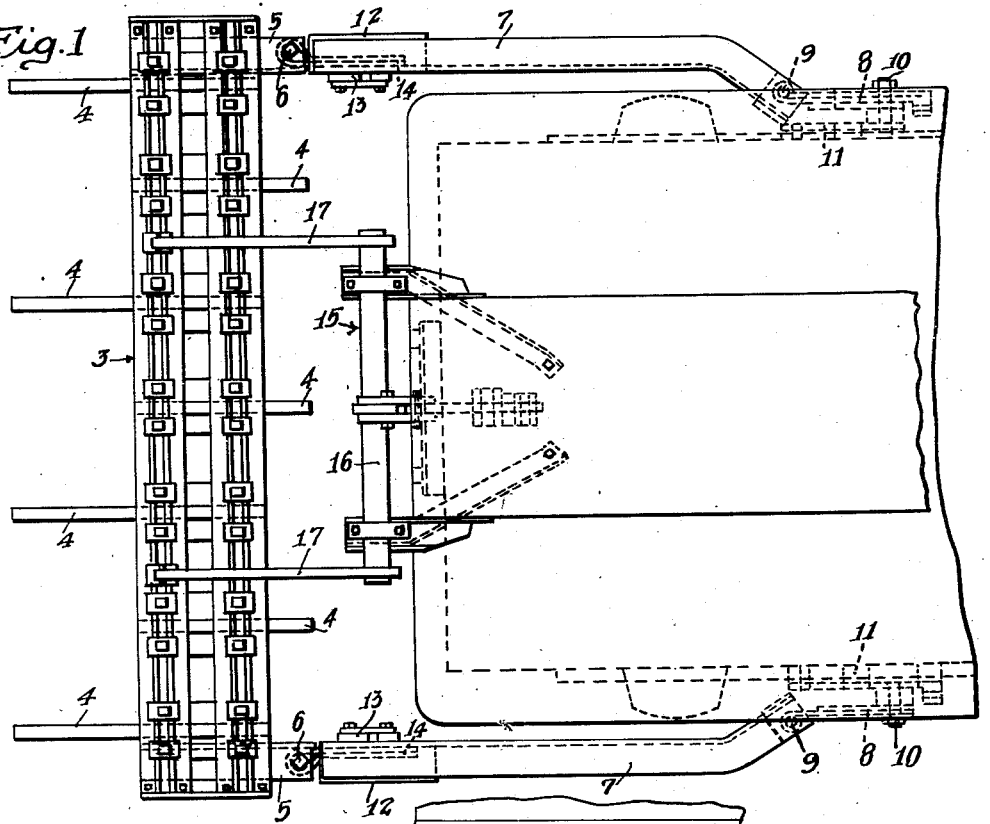
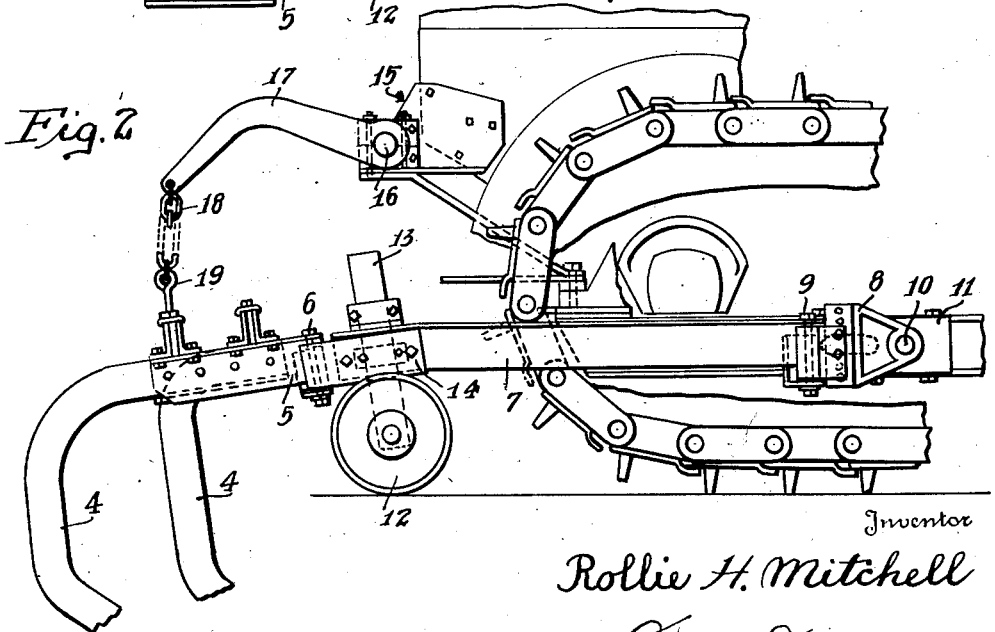
Inventor
Rollie H. Mitchell
By Lyon & Lyon
Attorneys Patented Dec. 20, 1938

2,140,712

UNITED STATES PATENT OFFICE 2,140,712

DIRECT CONNECT IMPLEMENT

Rollie H. Mitchell, Walnut Park, Calif., assignor, by mesne assignments, to Killefer Manufacturing Corporation, a corporation of California Application July 6, 1936, Serial No. 88,972

4 Claims. (Cl. 97—47)

This invention relates to improvements in the direct connected implement described in United States application Serial No. 656,420, filed February 13, 1933.

It is one of the principal objects of this invention to provide the forwardly extending attachment arms of the implement of the aforesaid application with suitable pivotal means to permit a limited lateral movement of the tool with respect to the tractor, thereby permitting the direction of travel of the tractor to be corrected in case it gets too close to one side or the other or varies slightly from its course without causing the implement to be kicked or abruptly forced out of its line of travel as happens when the side arms are rigid.

A further object is to provide the tool frame with depth controlling wheels.

Other objects and advantages of this invention will be apparent from the following detailed description of the preferred embodiment thereof as illustrated in the accompanying drawing.

In the drawing:

Figure 1 illustrates a plan view of the implement showing the manner of attachment of the tool frame to a tractor. The tractor is only partially shown.

Figure 2 is a fragmental side elevation of Fig. 1 and further illustrates the connection of the tool frame to the tractor.

In the preferred form of the invention the tool frame 3 is formed of suitable structural material to form a strong rigid frame to which the earth working tools 4 are securely fastened. The earth working tools are supported from the frame 3 by securing members 3a positioned between the frame angles. At each side of the tool frame one of the structural frame members 5 extends sufficiently forward to provide a bearing for the vertically directed pivot bolt or pin 6 by means of which the rear end of the forwardly extending attachment arm 7 is pivotally connected to the tool frame. As will be appreciated, there is an attachment arm for each side of the tool frame and pivotally connected thereto in the manner above set forth. The attachment arms extend forwardly along each side of the tractor and provide means for connecting the tool frame to the tractor. The forward end of each attachment arm is pivotally connected to a universal link 8 by a vertically directed pivot bolt or pin 9. Each universal link is pivotally connected to the tractor by the horizontally directed pivot bolts or pins 10. These horizontal pivot pins 10 are carried by brackets 11 securely fastened to the tractor frame in any suitable manner.

By coupling the tool frame to the tractor in the manner just described, the tractor may be steered, or its course slightly changed, without throwing the tool frame and tools carried thereby abruptly out of their line of travel as is the case with rigidly coupled tool frames. This feature enables the operator to more easily control the cultivating operation and to perform the cultivation more perfectly.

A further feature incorporated in this structure is the inclusion of a depth controlling means for governing the depth to which the earth-working tools operate in the soil. This means includes a pair of wheels 12 carried upon standards 13 suitably supported upon brackets 14 carried by the rear ends of the attachment arms. The standards 13 are of sufficient length to permit the wheels to be raised or lowered and to thereby control the depth to which the tools may work in the soil.

The tool frame 3 may be lifted to in turn lift the tools above the level of the soil by means of a tractor power lift of standard design, conventionally shown at 15. This lifting means operates a transverse shaft 16 having lift arms 17 fixedly mounted thereon in spaced relation, as may be noted in the drawing. The free end of each of the lift arms is connected to the rear end of the tool frame by means of chains 18 and eye bolts 19.

In operation the tool frame 3 will be maintained in its elevated position until the locality at which cultivation is to start, whereupon the lift means may be actuated to lower the frame and to thereby permit the tools to enter the soil. The depth to which the tool will ride into the ground can be controlled by the depth control wheels 12, which means is made adjustable for this purpose. During the cultivation it is necessary to occassionally slightly change the course of travel of the tractor and, due to the horizontal pivotal connecting means which permits of a limited lateral movement between the frame and tractor, the line of travel of the tractor may be changed without abruptly throwing the frame and its tools from their normal line of travel. However, when the tractor is to make a greater turning movement, the slight movement permitted between the tractor and frame will not interfere with the turning of the tractor.

As is usual when a full turn is to be made by the tractor, the frame may be lifted to clear the tools so as to permit a free turning operation and, upon completion of the turning operation, the implement may be returned to its operative condition.

In actual operation the implement has been found to work extremely well and is more easily operated and may be more accurately drawn along its intended line of travel and, as a result, the cultivating is more perfectly performed.

Having fully described the invention, it is to be understood that it is not to be limited to the details herein set forth but the invention is of the full scope of the appended claims.

I claim:

1. In a direct connected cultivating implement adapted for connection upon a tractor, a frame, separate attachment arms, horizontal pivoting connections between the attachment arms and the frame at each side of the tractor, attachment brackets adapted to be secured upon opposite sides of the tractor, universal pivotal connections between the attachment arms and the brackets, and depth controlling wheels carried by the attachment arms near the point of pivotal connection of the frame and the attachment arms.

2. In a direct connected ground working implement adapted for direct conection with a tractor having a power lift, a tool supporting frame, means connecting the tool supporting frame with the power lift, separate attachment arms, brackets adapted to be mounted upon opposed sides of the tractor, vertically extending pivot pins connecting the attachment arms with the frame at points near the rear of the tractor, universal pivotal connections between the forward ends of the attachment arms and the brackets, and depth controlling wheels adjustably carried by the attachment arms near the point of pivotal connection with the frame.

3. An implement adapted for direct connection with a tractor, comprising a transversely disposed frame, ground working tools supported on said frame, a pair of attachment arms pivotally connected adjacent opposite ends of said frame, respectively, for lateral swinging movement relative thereto and adapted to extend forwardly along opposite sides of the tractor, means disposed at the forward ends of said attachment arms for pivotally connecting the latter to the sides of the tractor providing for both vertical and lateral swinging movement relative thereto, and ground engaging means carried by said implement, for determining the depth of operation of said ground working tools.

4. An implement adapted for direct connection with a tractor, comprising a transversely disposed frame, ground working tools supported on said frame, a pair of attachment arms pivotally connected adjacent opposite ends of said frame, respectively, for lateral swinging movement relative thereto and adapted to extend forwardly along opposite sides of the tractor, means disposed at the forward ends of said attachment arms for pivotally connecting the latter to the sides of the tractor providing for both vertical and lateral swinging movement relative thereto, and ground engaging means adjustably mounted on said attachment arms near said pivotal connection with said frame, for determining the depth of operation of said ground working tools.

ROLLIE H. MITCHELL.